July 21, 1942.  E. F. RIESING  2,290,621
RESILIENT SUPPORT FOR PIPES AND THE LIKE
Filed March 16, 1940
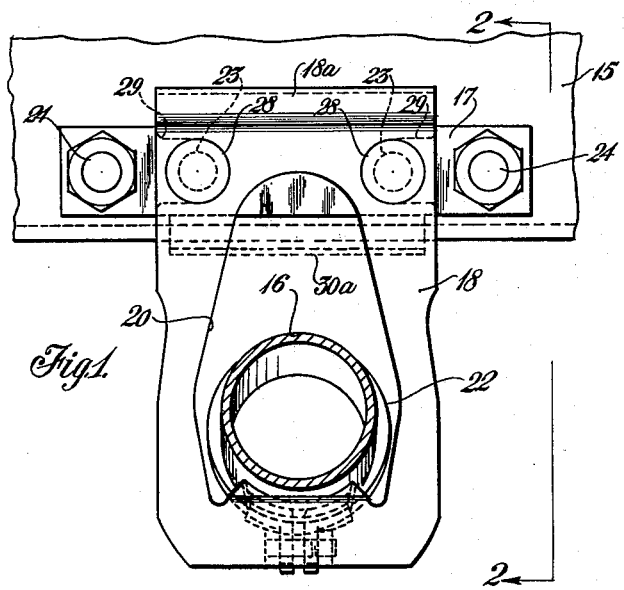
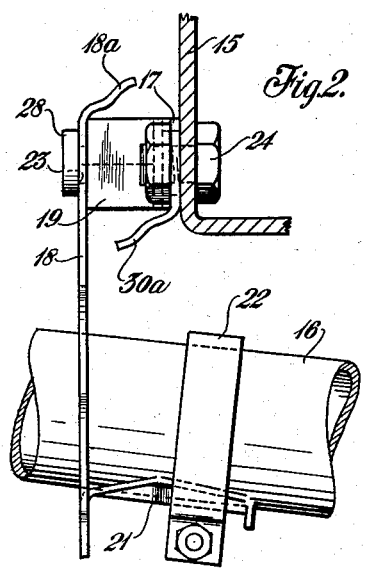
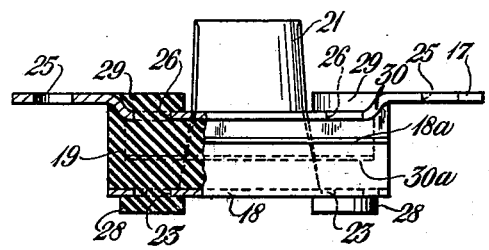
INVENTOR
Ellwood F. Riesing
BY
ATTORNEYS Patented July 21, 1942

2,290,621

UNITED STATES PATENT OFFICE 2,290,621

RESILIENT SUPPORT FOR PIPES AND THE LIKE

Ellwood F. Riesing, Akron, Ohio, assignor to The Firestone Tire & Rubber Company, Akron, Ohio, a corporation of Ohio Application March 16, 1940, Serial No. 324,340

3 Claims. (Cl. 248—54)

This invention relates to resilient supports for pipes and the like, and more especially it relates to devices for resiliently suspending pipes from supporting structures in situations where there usually is considerable relative movement between the pipe and the structure with which it is associated.

The invention is of primary utility in the supporting of the muffler and/or the exhaust pipe of a motor vehicle, especially in vehicles wherein the motor is supported on rubber mountings and thus is free to vibrate relatively of the frame of the vehicle. The invention also permits the necessary relative movement in the exhaust pipe and muffler relatively of the vehicle frame when the latter is sprung out of normal alignment, as when one wheel of the vehicle passes over an obstruction. The invention also is designed with the view to conditions arising when the exhaust pipe is longitudinally elongated due to thermal expansion, which elongation frequently amounts to as much as one-quarter inch.

The chief objects of the invention are to provide an improved pipe support of the character mentioned that readily will flex upon relative movement of the supporting and the supported members; to provide a safety construction whereby there will not be complete separation of the supported and the supporting members upon complete failure of the rubber that constitutes the resilient element of the device of the invention; to provide a device of the character mentioned wherein the rubber of the structure is spaced at an adequate distance from the supported structure so as not seriously to be affected by the heat thereof; to provide a support of the character mentioned comprising rubber, and so arranged with relation to the frame of the vehicle and the exhaust pipe that elongation of the latter due to thermal expansion imparts tension to said rubber; to provide a mechanical interlock of rubber and metal such as to prevent separation thereof even if failure of adhesion between the rubber and metal should occur; and to provide a resilient support of the character mentioned that provides increasing resistance to deformation in one direction at least. Other objects will be manifest as the description proceeds.

Of the accompanying drawing:

Figure 1 is an elevation of an embodiment of the invention in the form employed at the rear end of the exhaust pipe for supporting the latter, said exhaust pipe and a portion of the vehicle frame being shown in operative association therewith;

Figure 2 is a side elevation of the invention as viewed from the line 2—2 of Fig. 1;

Figure 3 is a plan view of resilient support, a part being broken away and in section.

In motor vehicles of usual construction, an exhaust pipe extends rearwardly from the motor and discharges into the front end of a muffler, and the latter discharges into a tail pipe that extends from the rear thereof to the rear end of the vehicle. The exhaust pipe and tail pipe are supported from various parts of the frame of the vehicle, and sometimes extend through apertures in said frame. Exhaust gases from the motor are very hot, and as a consequence, the exhaust piping and muffler becomes heated, with resulting thermal expansion of said piping. Since the exhaust piping is connected to the motor at the front end of the car, and said motor is substantially fixed in position with relation to the frame of the vehicle, it follows that elongation of the exhaust piping due to thermal expansion must be in the direction of the rear of the vehicle. The several pipe supports constituting the subject matter of this invention are interposed between the vehicle frame and the exhaust piping to support the latter from the frame, and are so positioned with relation to the frame that elongation of the piping, due to thermal expansion, will result in the imparting of tension to the rubber constituent of the pipe support, which condition has been found most satisfactory for the proper functioning of the supports. Thus in the embodiment of the invention shown in the drawing, the resilient supports are attached to the rear faces of the frame members.

Referring now to the drawing, there is shown a portion of a channel 15 that constitutes one of the cross members of a motor-vehicle frame, and a section of an exhaust pipe 16. The latter extends transversely of the channel 15 and is suspended therefrom by means of a resilient support that comprises a metal attaching plate 17, a supporting plate 18, and a resilient body of rubber 19 interposed between said plates mechanically and chemically bonded to each of them. The supporting plate 18 has a generally rectangular profile, and is formed with a central aperture 20 of substantial size through which the pipe 16 extends. At the lower margin of said aperture, the plate 18 is formed with an integral laterally extending lip 21, the latter being transversely arcuate in shape and constituting a supporting structure in which the pipe 16 snugly rests. The lip 21 may be disposed at an angle to horizontal position, as shown, so as to be parallel to the pipe 16. A metal strap 22 that encircles the lip 21 and pipe 16 is provided for securing them to each other. At its upper end the plate 18 is formed with a pair of apertures 23 disposed adjacent its lateral margins.

The attaching plate 17 is a metal strap that is secured to the channel 15 by means of bolts 24 or the like, said bolts extending through respective bolt holes 25 in the end portions of the plate. The medial portion of the plate 17, between the bolt holes 25, is outwardly bowed, as is best shown at 30, Fig. 3, so as to stand in spaced relation to the channel 15 when it is attached thereto, said bowed portion being formed with a pair of apertures 26, 26 adjacent the respective ends thereof. The supporting plate 18 and the attaching plate 17 are disposed preferably in spaced parallel planes, the attaching plate being positioned at the upper end of the supporting plate. Said plates are connected by an intervening body of rubber 19 that is vulcanized to each, said plates being brass-plated to improve the chemical bond effected by the vulcanization of the rubber. On the front of the supporting plate 18 are formed rubber buttons 28, 28 that are concentric with the apertures 23 and are integrally united with the rubber body 19 by necks of rubber that extend through said apertures. In like manner rubber buttons 29, 29 formed on the rear face of the attaching plate 17, on the medial bowed region thereof, are united with the rubber body 19 by necks of rubber extending through the apertures 26, the top faces of buttons 29 being flush with the adjacent surface of the end portions of the attaching plate. The buttons 28 and 29 are bonded to the metal structures, the arrangement being such as to provide a mechanical interlock of the rubber and metal that is strong enough to support the load to be carried by the support even if there should be a complete failure of the adhesion of the rubber to the metal, such as sometimes occurs due to the extreme heat of the exhaust pipe which may be conducted through the metal of the support to the body of rubber. As shown in Figure 1, the central aperture 20 in the supporting plate 18 may extend higher than the bottom margin of the attaching plate 17, in which case the contour of the lower face of rubber body 19 will be coincident with the contour of the top of said aperture. The rubber of the body 19 is relatively soft and resilient since the load to be supported is relatively light. Rubber composition of about 35 durometer hardness has been found very satisfactory for the purpose.

The resilient support is designed to offer an increasing rate of resistance to deformation of the rubber body 19 upon movement of the pipe 16 downwardly with relation to the channel 15, and to this end the upper margin of the supporting plate 18 is formed with an integral flange 18a that extends obliquely over the rubber body 19, and the lower margin of the bowed portion 30 of attaching plate 17 is formed with an integral flange 30a that extends obliquely beneath the rubber body 19, the said flanges 18a, 30a overlapping each other in a vertical direction. The arrangement is such that in the event of extreme downward movement of the pipe 16 relatively of the channel 15, the flanges 18a, 30a will progressively engage the top and bottom faces, respectively, of the rubber body 19, with the result that the resistance to deformation of the latter progressively increases. The fact that the flange 18a overlaps the flange 30a in a vertical direction is a safety feature that will function if there should be complete failure of the rubber body 19, in which case the flange 18a would come to rest upon flange 30a and further drop of the pipe 16 would be prevented.

From the foregoing it will be apparent that the invention provides a safe, simple, and economical support for a hot exhaust pipe for motor vehicles, which support readily permits relative movement between the pipe and the frame of the vehicle in all directions.

Modification may be resorted to without departing from the spirit of the invention or the scope thereof as defined in the appended claims.

What is claimed is:

1. A resilient support of the character described comprising a metal plate attachable to a supporting structure, a metal plate attachable to a supported structure, and a body of rubber between said plates and bonded to each of them, each of said plates being integrally formed with a flange that extends obliquely in the direction of the other plate and is obliquely disposed with relation to the adjacent face of the rubber body so as progressively to contact the latter upon relative movement of the supporting and the supported structures in one direction.

2. A combination as defined in claim 1 in which one of the oblique flanges is above the rubber body and the other is below the rubber body, said flanges overlapping each other in a vertical direction.

3. A resilient support of the character described comprising a metal plate attachable to a supporting structure, a metal plate attachable to a supported structure, a body of rubber between said plates and bonded to each of them, and respective elements attached to said plates and extending toward the other plate on opposite sides of the rubber body, each of said elements and the adjacent face of the rubber body being obliquely disposed with relation to each other so as progressively to effect operative engagement of said elements and rubber body upon relative movement of the supporting and supported structures in one direction.

ELLWOOD F. RIESING.